Patented July 6, 1948

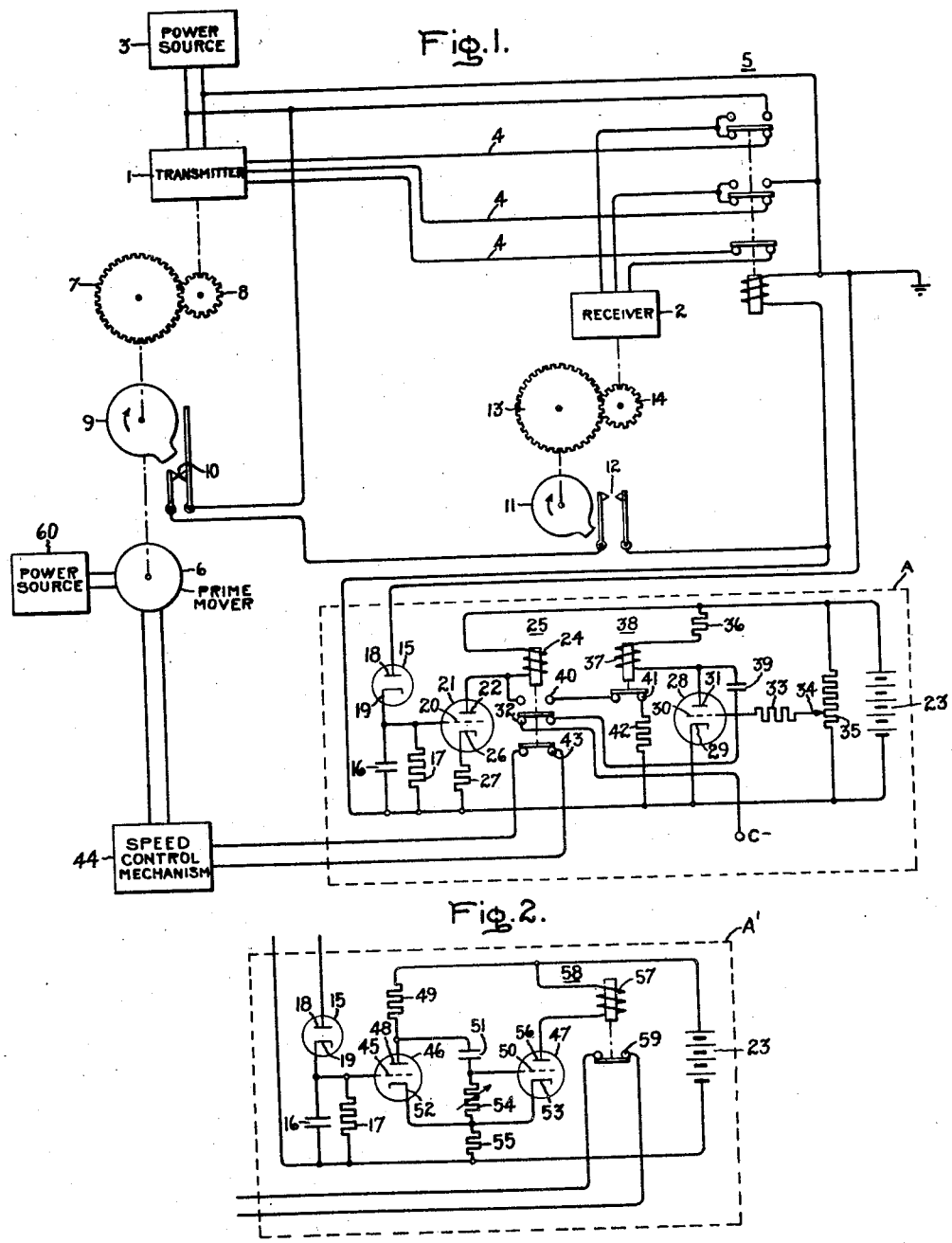
Inventors:
Harry Whalley,
George Shand,
by Merton D Mons
Their Attorney.

2,444,796

UNITED STATES PATENT OFFICE 2,444,796

ELECTRICAL SYNCHRONIZING CONTROL SYSTEM

Harry Whalley and George Shand, Sale, England, assignors to General Electric Company, a corporation of New York Application November 26, 1947, Serial No. 788,100 In Great Britain May 21, 1946

Section 1, Public Law 690, August 8, 1946

5 Claims. (Cl. 318—437)

Our invention relates to telemetering systems and more particularly to such systems wherein either continuous or step-by-step rotation is transmitted at relatively high speed.

As is well-known in the art, such telemetering systems generally have a number of stable positions; therefore, in order to insure proper operation, the transmitter and receiver must be correctly aligned. It is desirable to employ automatic means for so aligning such a system.

In a customary method for automatically aligning the transmitter and receiver, both are provided with correctly phased lining-up or reference positions. When the transmitter and receiver start out of alignment, both rotate until such time as the receiver reaches its reference position, whereupon its motion is arrested independently of the transmitter until such time as the transmitter reaches its reference position. At this time, the restraint is removed from the receiver and transmitter and receiver continue to rotate in synchronism.

Conventional means for arresting the movement of the receiver comprise decoupling the receiver from the transmitter, and simultaneously blocking the receiver rotor by the application of suitable external power. This is customarily accomplished by means of cam-operated contacts which complete the circuit of an energizing coil on a synchronizing relay in response to misalignment of transmitter and receiver. Such conventional means are subject to faulty operation in cases where the speed of rotation is relatively high, since the cam-operated contacts remain closed for a very brief time interval; resulting in unreliable operation of the synchronizing relay.

It is a particular object of our invention to provide reliable means for automatically aligning a relatively high speed telemetering system.

The features of our invention which we believe to be novel are set forth with particularity in the appended claims. Our invention itself, however, together with further objects and advantages thereof, may best be understood by reference to the following description taken in connection with the accompanying drawing, in which Fig. 1 is a schematic diagram of a telemetering system which suitably embodies the invention, and Fig. 2 is a schematic diagram of a modification of that portion of the circuit of Fig. 1 within the dashed rectangle A. Like reference numerals signify similar elements in the figures.

Referring to Fig. 1, there is shown in schematic form a telemetering system comprising a transmitter 1 and a receiver 2, which may be direct current step-by-step motors, direct current self-synchronous motors, or alternating current self-synchronous motors. Power of a suitable nature is supplied to the transmitter 1 from an external power source 3. The transmitter 1 and receiver 2 are coupled by a suitable number of transmission lines 4, each of which passes through a pair of normally closed contacts of a synchronizing relay 5. Pairs of normally open contacts are also provided on the synchronizing relay 5 for connecting the external power source 3 to the receiver 2 whenever relay 5 is energized.

A predetermined periodic motion may be imparted to the transmitter 1 by any suitable means; such means as shown take the form of a driving motor or prime mover 6, which may be mechanically coupled to the transmitter 1 by any suitable means; for example, a pair of spur gears 7, 8 may be used. Power for operating prime mover 6 is supplied from any suitable source 60. Included in the mechanical coupling between the prime mover 6 and the transmitter 1 is a cam 9 which is adapted to intermittently operate a pair of normally closed contacts 10. The receiver 2 is provided with a similar cam 11 for intermittently operating a pair of normally open contacts 12.

In order to insure that the cams 9, 11 will rotate at a common speed whenever the synchronizing relay 5 is deenergized, a pair of spur gears 13, 14, having the same reduction ratio as gears 7, 8, is provided for the receiver and its associated cam. Useful output may be derived from the receiver 2 in any suitable manner, not shown. The energizing coil of synchronizing relay 5 is arranged in series with the two pairs of cam-operated contacts 10, 12 and the external power source 3.

In accordance with our invention, we provide a circuit, shown within the dashed rectangle A, for controlling the speed of the prime mover 6 in order to insure substantially perfect alignment between the transmitter 1 and the receiver 2. Connected across the energizing coil of the synchronizing relay 5 is a series combination of a diode 15 and its associated load circuit comprising a capacitance 16 shunted by a resistance 17. The anode 18 of diode 15 is connected directly to one terminal of the external power source 3. The cathode 19 of diode 15 is connected to the control electrode 20 of a first electron discharge device 21, the anode 22 of which is connected to a suitable source of positive direct operating voltage, here shown as a battery 23, through the energizing coil 24 of a first control relay 25. The cathode 26 of device 21 is connected to the low potential side of source 23 through a cathode resistance 27.

The control circuit also includes a second electron discharge device 28 comprising a cathode 29, a control electrode 30, and an anode 31. The cathode 29 of device 28 is directly connected to the low potential side of the battery 23. The control electrode 30 of device 28 is connected to a suitable source of negative direct bias voltage C— through a pair of normally closed contacts 32 on the first control relay 25. Control electrode 30 is also connected through a resistance 33 to a variable tap 34 on a resistance potentiometer 35 which is shunted across the battery 23. The anode 31 of device 28 is connected to the positive terminal of source 23 through a voltage dropping resistance 36 and the energizing coil 37 of a second control relay 38, and to the control electrode 30 through a capacitance 39. The anode 22 of device 21 is connected to the negative terminal of the battery 23 through a pair of normally open contacts 40 on relay 25, a pair of normally closed contacts 41 on relay 38, and a resistance 42. A third pair of contacts 43, normally closed, on relay 25 serves to operate in any suitable manner a speed control mechanism 44 for controlling the prime mover 6. For example, contacts 43 may be connected in series with a field shunting resistor, not shown, so that when relay 25 is energized, the speed of the prime mover 6 is reduced.

In operation, when power is supplied to the prime mover 6, the transmitter 1 is made to rotate and drive the receiver 2. This rotation continues until such time as the receiver-operated cam 11 closes contacts 12. At this time, if the transmitter and receiver are misaligned, the energizing coil of the synchronizing relay 5 receives a short pulse from the external power source 3. In response to this pulse, the synchronizing relay 5 is momentarily actuated, and the receiver 2 is decoupled from the transmitter 1. Simultaneously, power is supplied to one phase of the receiver from the external source 3. As is well-known in the art, application of suitable power to one phase of the receiver blocks the rotor thereof; therefore, the receiver 2 is momentarily arrested. It will be understood that other means may be employed to lock the receiver; for example, an electromagnetically-operated brake may be used. While the receiver is momentarily locked, the transmitter continues to rotate until such time as its associated cam 9 opens contacts 10. At this time, the synchronizing relay 5 is deenergized, and the receiver is once again coupled directly to the transmitter. It will be seen that alignment may require several such cycles. Thereafter the transmitter and receiver continue to rotate in synchronism. Subsequent operation of the pairs of contacts 10 and 12 by their respective cams does not effect the synchronizing relay 5, since one of the pairs of contacts is always open at the time that the other is closed.

In practice, it is often found that when the speed of the transmitter is relatively high, the duration of the closure of interlock 12 is insufficient to operate the synchronizing relay with a sufficient degree of reliability. Accordingly, we provide the control circuit within dashed rectangle A for deriving a second pulse of longer duration from the pulse appearing across the coil of the synchronizing relay. When the synchronizing relay 5 is energized, current is made to flow through diode 15, and a charge is accumulated across its associated load capacitance 16. The value of this capacitance is so chosen that an appreciable voltage is developed during the momentary closure of interlock 12. As soon as the initiating voltage ceases due to opening of contacts 12, diode 15 ceases to conduct, and capacitance 16 commences to discharge through resistance 17; therefore a positive voltage is applied to the control electrode 20 of device 21. The time constant of the diode load circuit, comprising capacitance 16 and resistance 17, is made relatively long so that the control electrode 20 is positively biased for a sufficiently long period to insure actuation of control relay 25. At this time, contacts 32 open disconnecting the control electrode 30 of device 28 from the negative bias voltage source C—; contacts 43 open, resulting in a decrease in the speed of the prime mover 6; and contacts 40 close, providing energizing voltage for coil 24 from source 23. Device 28 which had been biased beyond cutoff by source C— prior to actuation of relay 25, is now given a positive bias through resistance 33. As device 28 continues to conduct, the anode current rises at a rate determined by capacitance 39, resistance 33, and potential divider 35. Anode current flows through device 28 until coil 37 of the second control relay 38 is energized. This opens contacts 41 and deenergizes relay 25, thus resetting the control circuit for any subsequent operation. During the time that relay 25 is energized, this time being considerably longer than the time during which the synchronizing relay 5 is energized, the speed of prime mover 6, and hence of the transmitter 1, is reduced sufficiently to insure proper operation of synchronizing relay 5 in the event of any subsequent misalignment.

Referring to Fig. 2, there is shown within dashed rectangle A' a modification of that portion of Fig. 1 within the dashed rectangle A, other elements of the system being identical with those of Fig. 1. In this modification, we again employ a diode 15 for deriving a second, longer, pulse from the pulse appearing across the coil of synchronizing relay 5. However, the resultant positive discharge voltage appearing across resistance 17 is applied to the control electrode 45 of the first of a pair of electron devices 46, 47. In this application, devices 46, 47 are connected as a single-shot multivibrator, the operation of which is well-known in the art. The anode 48 of device 46 is connected to the positive terminal of a suitable source of positive direct operating voltage, here shown as a battery 23, through a series resistance 49, and to the control electrode 50 of device 47 through a coupling capacitance 51. The cathodes 52, 53 of devices 46, 47 are connected to the negative terminal of source 23 through a common cathode resistance 55. The control electrode 50 of device 47 is connected to the negative terminal of source 23 through a variable resistance 54 and cathode resistance 55. The anode 56 of device 47 is connected to the positive terminal of source 23 through the energizing coil 57 of a control relay 58, the normally open contacts 59 of which are connected to the speed control mechanism 44 associated with the prime mover 6 in a manner similar to that shown in Fig. 1.

In operation, device 47 constitutes the normally conducting tube of the aforementioned single-shot multivibrator; hence relay 58 is normally energized and contacts 59 are closed. When a positive discharge voltage appears across resistance 17 in the manner explained in connection with Fig. 1, device 46 is made to conduct, and the fall in anode potential is applied through coupling capacitance 51 to the control electrode 50 of device 47. This biases device 47 beyond cutoff and deenergizes relay 58, at which time contacts 59 are opened and the transmitter speed is reduced in a manner similar to that explained in connection with Fig. 1. The charge on capacitance 51 leaks away through resistance 54, and when the voltage across resistance 54 reaches the cutoff bias of device 47, the latter again becomes conductive, and relay 58 is reset. Hence device 47 has been cut off for a time period depending primarily upon the values of capacitance 51 and resistance 54, and during this period of cutoff the transmitter speed has been reduced. Reliable operation of synchronizing relay 5 is thus insured.

While we have shown and described certain present preferred embodiments of our invention, it will be understood that numerous variations and modifications may be made, and we contemplate in the appended claims to cover any such modifications as fall within the true spirit and scope of our invention.

What we claim as new and desire to secure by Letters Patent of the United States is:

1. In a telemetering system, a transmitter, a receiver self-synchronously coupled to said transmitter, means for imparting a predetermined periodic motion to said transmitter, means for deriving a pulse from said system in response to misalignment of said receiver and said transmitter, means for simultaneously decoupling said receiver from said transmitter and arresting the motion of said receiver for the duration of said pulse, and means for altering the speed of said transmitter in response to said pulse.

2. In a telemetering system, a transmitter, a receiver self-synchronously coupled to said transmitter, means for imparting a predetermined periodic motion to said transmitter, means for deriving a first pulse in response to misalignment of said transmitter and said receiver, means actuated by said first pulse for simultaneously decoupling said receiver from said transmitter and arresting said receiver at a reference position for the duration of said first pulse, means for deriving a second pulse from said first pulse, said second pulse being of longer duration than said first pulse, and means for decreasing the speed of said transmitter in response to said second pulse.

3. In a direct current telemetering system of the step-by-step type, a transmitter, a receiver self-synchronously coupled to said transmitter, means for rotating said transmitter, cam-operated means for deriving a pulse in response to misalignment of said transmitter and said receiver, a synchronizing relay actuated by said pulse for simultaneously decoupling said receiver from said transmitter and arresting said receiver at a reference position for the duration of said pulse, a network comprising a capacitance and a discharge resistance, said network having a time constant long relative to the duration of said pulse, means for charging said capacitance in response to said pulse, and relay means actuated by the discharge of said capacitance for decreasing the speed of said transmitter for a time interval longer than the duration of said pulse.

4. In a telemetering system, a transmitter, a receiver self-synchronously coupled to said transmitter, means for imparting a predetermined periodic motion to said transmitter, means for deriving a pulse in response to misalignment of said transmitter and said receiver, means actuated by said pulse for simultaneously decoupling said receiver from said transmitter and arresting said receiver at a reference position for the duration of said pulse, a first control relay, means for operating said first relay in response to said pulse, means controlled by operation of said first relay for completing a self-holding circuit and for simultaneously decreasing the speed of said transmitter, a second control relay, means responsive to operation of said first relay for operating said second relay after a predetermined time delay, and means responsive to operation of said second relay for interrupting said self-holding circuit.

5. In a telemeteing system, a transmitter, a receiver self-synchronously coupled to said transmitter, means for imparting a predetermined periodic motion to said transmitter, means for deriving a pulse in response to misalignment of said transmitter and said receiver, means actuated by said pulse for simultaneously decoupling said receiver from said transmitter and arresting said receiver at a reference position for the duration of said pulse, a single-shot multivibrator, the operating period of said multivibrator being longer than the duration of said pulse, means for actuating said multivibrator in response to said pulse, and relay means actuated in response to operation of said multivibrator for decreasing the speed of said transmitter during said operating period.

HARRY WHALLEY.
GEORGE SHAND.